United States Patent Office  3,384,693
Patented May 21, 1968

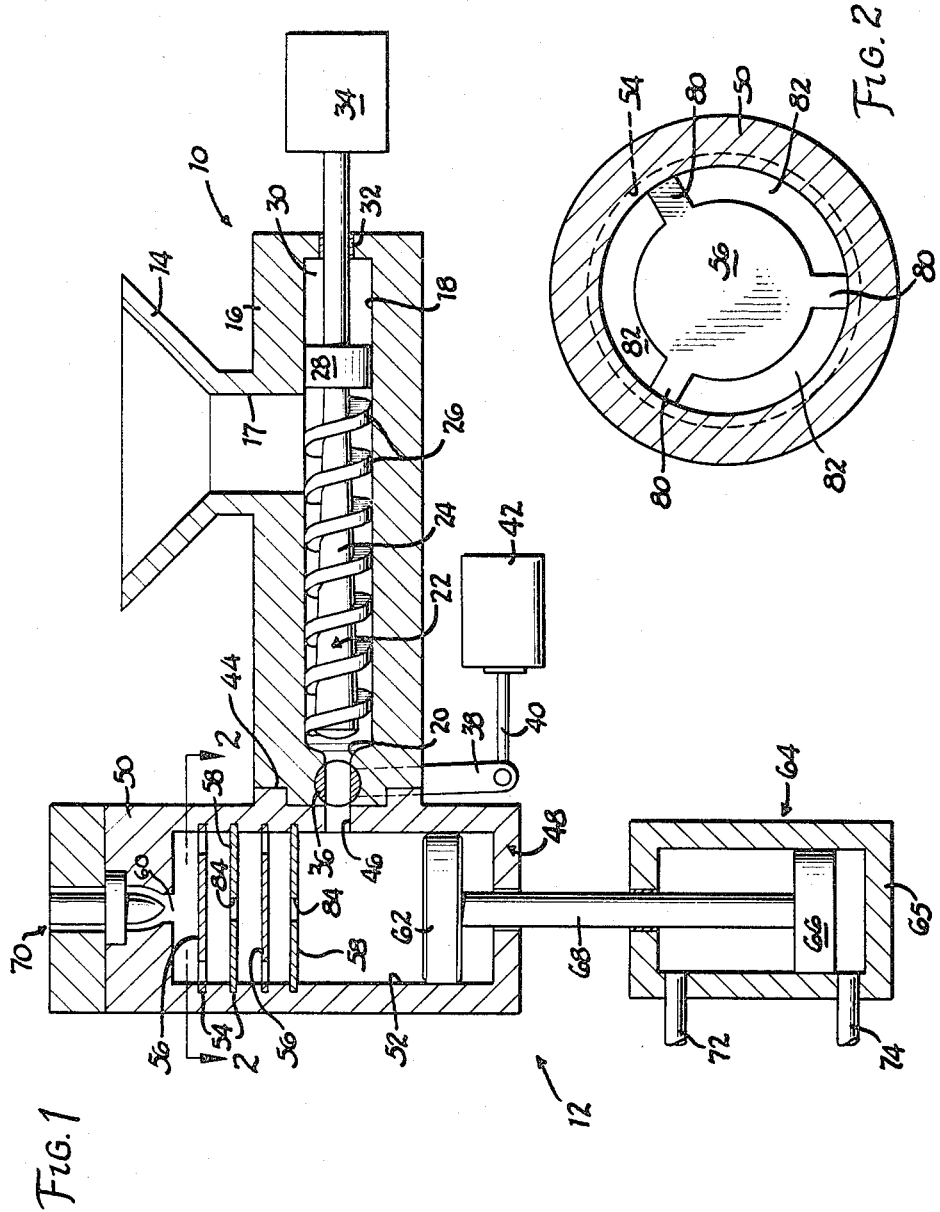

3,384,693
METHOD FOR MIXING PLASTIC COMPOSITIONS
Sheldon F. Roe, Jr., Toledo, Ohio, assignor to Owens-Illinois Inc., a corporation of Ohio
Filed Aug. 24, 1964, Ser. No. 391,640
3 Claims. (Cl. 264—211)

ABSTRACT OF THE DISCLOSURE

A method of homogeneously dispersing pigment in a plastic composition by first mixing the pigment and composition in a helical pattern and secondly mixing the pigment and composition in a second non-helical pattern so as to subject the mixture to sequential axial and transverse shear forces. The first mixing can be readily carried out in a conventional screw-type extruder and the second step is carried out in a pressure chamber provided with a series of radial baffles having offset apertures, the mixture being advanced through the pressure chamber by means of a hydraulically actuated piston.

---

The present invention relates to a system for homogeneously mixing and forming plastic compositions into useful products, and more particularly to a system, including a method and apparatus, for evenly dispersing pigment particles throughout a plastic composition during plasticizing, mixing and extrusion thereof into useful form.

In the past it has been common practice to mix a pigment ingredient into a plastic composition prior to extrusion by use of a screw conveyor, located within a plasticizer-extruder, which feeds the composition through a series of offset or staggered baffle plate mixing elements located at the distal end of the screw; for example, see United States Letters Patent No. 2,540,146.

The plastic products manufactured by apparatus of the type described has sufficient uniformity of coloration to satisfy many commercial specifications, however, the coloration is not homogeneously distributed throughout the plastic composition in its extruded state, particularly when output demand is high. Often pigment flow lines may be easily observed by only cursory visual inspection of the plastic products thereby produced. Consequently, plastics produced by the above described prior art procedure fall, or may fall, below the commercially accepted coloration standards for some types of products.

To improve colorant dispersion, the addition of apertured baffle plate mixing elements has been proposed, such elements being interposed between the output end of the screw and the extrusion orifice. However, pigment flow lines are still present. The presence of the pigment flow lines in the plastic products is believed to be due to the fact that the baffle plate mixing elements of the cited prior art apparatus do not completely break and disperse the continuity of the flow lines created in the composition emerging from the screw conveyor of the plasticizer-extruder. That is to say, the helical pattern of displacement of the plastic composition is believed to continue, in part, through the baffle plate mixing elements.

The present invention overcomes the above described prior art deficiencies by providing a method and apparatus which separately shear-mixes the composition ingredients, including the pigment, into two separate independent mixing patterns at spaced locations. In this way any residual pigment flow lines occasioned by the first mixing pattern are obliterated by the second independent mixing pattern, and the issuing plastic product appears to the human eye to have uniform coloration.

Accordingly, it is a primary object of the present invention to provide a system, including method and apparatus, for essentially uniformly dispersing pigment particles throughout a plastic composition by separate, independent mixing patterns so that the issuing plastic products will have a visual appearance of uniform coloration. The present invention may be used, for example, in producing extruded pipe, or in conjunction with bottle-blowing apparatus and the like.

It is another important object of this invention to provide a system of essentially uniformly dispersing pigment particles throughout a plastic composition, which system has economic advantages over the prior art.

It is an additional object to provide a system of essentially uniformly dispersing pigment particles throughout a plastic composition without unduly increasing the temperature of the composition to thereby avoid high temperature deterioration of the composition.

These and other objects and features of the present invention will become more fully apparent from the appended claims, as the ensuing detailed description proceeds in conjunction with the accompanying drawings in which:

FIGURE 1 is an elevational view, shown in cross-section, diagrammatically illustrating a presently preferred embodiment of the present invention for acomplishing the above referred to separate, independent mixing action, and FIGURE 2 is a transverse cross-section taken along the line 2—2 of FIGURE 1, illustrating one of the baffle plate mixing elements of the present invention.

As shown on the drawings:

FIGURE 1 diagrammatically illustrates a presently preferred embodiment of the present invention. Independent separate plastic composition shear-mixing patterns are facilitated by (1) the plasticizer-extruder 10 and the accumulator 12, which, in the illustrated embodiment, is situated so that its longitudinal axis is located transverse to the axis of the plasticizer-extruder 10.

The plasticizer-extruder 10 includes an influent hopper 14 through which plastic composition ingredients, preferably in granulated, flaked or powdered form, including pigment, are delivered for subsequent mixing, plasticizing and extrusion. The ingredients introduced through the influent hopper 14 are previously proportioned so that the issuing plastic product will be of the desired composition. The influent hopper 14 is illustrated as integral with a casing or barrel 16 of the plasticizer-extruder 10. The casing 16 has a central bore 18 which is in communication with the hopper 14 through a transverse port 17. Normally the casing 16 provides a heat exchange system (not shown) for converting the composition ingredients from their flaked, granule or powdered influent state to a plastic or molten state. Heat exchange systems for use in conjunction with plasticizer-extruders are well known and commercially available. Consequently, no further explanation of the heat exchange feature of the casing 16 is believed to be necessary.

Situated at the effluent end of the casing 16 is an orifice 20 through which the plasticized composition issues responsive to rotational displacement by a plasticizer-extruder screw 22.

The screw 22 is situated within the central bore 18 of the plasticizer-extruder casing 16. A shaft 24 of the screw 22 carries an integral helical flange 26 which, upon rotation of the screw conveyor 22, displaces and mixes the composition ingredients in a helical pattern between the port 17 and the orifice 20. Further, the screw 22 functions in the normal manner to shear and to plasticize the material so that it issues from the orifice 20 at a predetermined pressure. As illustrated in FIGURE 1, the shaft 24 carries a seal 28 immediately to the right of the transverse port 17 of the casing 16, which seal prevents entrance of the composition ingredients into an isolated annular chamber 30 of the bore 18. The shaft 24 is appropriately journaled in the casing 16 at the bearing 32 and is driven by variable speed motor 34.

Adjacent the illustrated lefthand distal end of the screw conveyor 22 within the orifice 20 is located a rotary valve 36 which is opened and closed by means of an arm 38 responsive to extension and retraction of a piston rod 40 of a cylinder assembly 42. The opening and closing of the valve 36 is synchronized with the operation of the accumulator 12 in a manner and for a purpose which will be subsequently made apparent.

The plasticizer-extruder 10 is fastened to the accumulator 12 at a juncture 44 in any desired manner, for example, by welding.

An inlet orifice 46 of a mixing chamber 48 of the accumulator 12 is directly aligned with the effluent or outlet orifice 20 of the plasticizer-extruder 10 to permit ready ingress of plasticized composition from the plasticizer-extruder 10 into the mixing chamber 48 when the valve 36 is opened.

The mixing chamber 48 of the accumulator 12 includes a cylinder 50 which defines an interior cylindrical chamber 52, the longitudinal axis of which is located essentially transverse of the longitudinal axis of the screw conveyor 22. The interior wall of the cylinder 50 at a cylindrical chamber 52, is provided with a series of spaced annular recesses 54 within which staggered or offset baffle plate mixing elements 56 and 58 are seated. As illustrated, the baffle plate mixing elements 56 and 58 are situated immediately adjacent an outlet orifice 60 of the cylinder 50.

The baffle plate mixing elements 56 and 58, in actual practice, are preferably designed to be assembled within recesses 54 of the cylinder 50, so as to be conveniently removable for cleaning and replacement. As illustrated in FIGURE 2, each mixing element 56 includes radial fingers 80 which extend into a recess 54 so as to provide three essentially arcuate, peripheral openings 82 through which the plastic composition is pressure-forced during the work stroke of the piston 62. On the other hand, the baffle mixing elements 58 are solid disc-shaped members, with the exception that each has a central aperture 84 which is concentrically located therein. Because of the described offset or staggered relation between the openings 82 of one mixing member 56 and the central aperture 84 of an adjacent mixing member 58, plastic composition flowing through the mixing members, responsive to pressure exerted by the piston 62, is subjected to high axial shear when passing through the openings 82 and the apertures 84 and is subjected to high transverse shear while moving transversely of the chamber 52 intermediate any two of the mixing members. Further, the alternate peripheral passages 82 and axial passages 84 prevent straight line flow through the cylinder 50 and force the material to flow in a turbulent, non-linear, tortuous path in which thorough mixing of plasticized material and pigment is promoted.

A die element 70 is conventionally attached to the outlet end of the cylinder 50 so as to be aligned with the orifice 60 thereof. In this instance, die element 70 is diagrammatically illustrated as being of the type used to form extruded tubular plastic products. However, it is to be appreciated that any desired die element may be utilized and that orifice 60 may accordingly be modified to be compatible with the die element selected.

The cylindrical chamber 52 has a precise tolerance diameter which complements the diameter of a piston 62 to permit reciprocal motion of the piston 62 in the cylindrical chamber 52 responsive to the actuation of a double-acting hydraulic cylinder assembly 64, without leakage of plastic composition to the back side of the piston 62. The piston 62 is integrally connected with a piston 66 of a cylinder assembly 64 by means of a shaft 68. The shaft 68 is appropriately sealed at its entrance into both the cylinder 50 and the cylinder 65 of the cylinder assembly 64 in conventional, well known manner.

The double-acting hydraulic cylinder assembly 64 is of conventional design, the movement of which is controlled by two hydraulic lines 72 and 74 which retract and extend pistons 62 and 66. The delivering and exhausting of hydraulic fluid through the lines 72 and 74 may be provided by commerically available valve and hydraulic pressure means.

In operation, the ingredients of the composition desired to be plasticized, mixed and extruded in the form of usable plastic products are introduced into the hopper 14 following proper proportioning thereof. While granular, flaked or powdered ingredients are normally used, it is to be appreciated that ingredients in liquid form could similarly be introduced into the hopper 14. The ingredients introduced into the hopper 14 are drawn through the transverse port 17 into the bore 18 by rotation of the screw 22, which is energized by the variable speed motor 34. Moderate pressures are exerted upon the ingredients as they are helically displaced by the helical blade 26 through the bore 18 toward the orifice 20.

The helical displacement of the ingredients causes a helical, moderate shearing action to take place between the particles to mix and co-mingle the ingredients as they move toward and out the orifice 20. In the case of introduction of solid ingredients, e.g., in granular, flaked or powdered form, these ingredients are plasticized by means of suitable heat exchange apparatus (not shown) contained within the casing 16 of the plasticizer-extruder 10 and by the reduced depth, pressure-generating periphery of the screw 22.

Concurrent with the operation of the screw 22 the accumulator 12 is operated by means of the double-acting hydraulic cylinder assembly 64, reciprocating the piston 62 within the cylindrical chamber 52. The pressures exerted by piston 62 against the plasticized composition within the cylindrical chamber 52 may be significantly higher than those exerted by the screw 22 of the plasticizer-extruder 10.

Consequently, in order to prevent feed-back of plasticized composition into the bore 18 from the cylindrical chamber 52 during the work stroke of the piston 62, the valve 36 is closed at that time. The valve 36, therefore, is synchronized to open during the retraction stroke of the piston 62 to permit ingress of plasticized composition into the chamber 52 from the bore 18 through the orifices 20 and 46 responsive to the rotation of the screw 22. Closing and opening of the valve 36 is accomplished by pivoting of the lever 38 responsive to extension and retraction of the piston rod 40 of the cylinder assembly 42. The cylinder 42 is preferably electronically actuated by a timer (not shown) to synchronize its movement to the actuation of the double-acting hydraulic cylinder assembly 64.

The screw 22 may be stopped when the valve 36 is closed or, alternatively, the screw may generate sufficient pressure internally of the barrel 16 to stall out the motor 34. Further, the piston 62 may be actuated sufficiently quickly that the screw 22 may continue to turn but without building up an excessive pressure in the barrel 16.

Plasticized composition introduced into cylindrical chamber 52 through the orifices 20 and 46 frequently contains pigment flow lines, the continuity of which were not broken and dispersed as the plasticized composition egressed from the plasticizer-extruder 16. In general, these flow lines extend through the composition so as to run essentially transverse across the cylindrical chamber 52. The high pressures exerted by the work stroke of the piston 62 within the cylindrical chamber 52 provides a mixing or shearing action of the plastic composition ingredients which is independent and separate from any mixing or shearing action in the plasticizer-extruder 10.

The plastic composition is alternately (1) displaced axially of the chamber 52 through the aperture 84 of one mixing element 58, (2) transversely displaced between the mixing elements 56 and 58 in essentially a radial direction, and (3) displaced axially through the peripheral arcuate openings 82 of one mixing member 56, all responsive to pressure forces induced by the work stroke of the piston 62. Consequently, there is no helical displacement component present in the movement pattern of the plastic composition through the cylindrical chamber 52. The plastic composition is alternately subjected to axial shear, followed by transverse, essentially radial shear only.

The plastic composition, when extruded in plastic product form through the die element 70, is of uniform coloration when visually inspected by the human eye. The pressure exerted by the piston 62 of the accumulator 12 is proportional to the power within the hydraulic system of the cylinder assembly 64 and, accordingly, may be varied as desired in order to provide the magnitude of homogeneity of the mixture desired and/or the output pressure desired at the orifice 60.

The invention may be embodied in other specific forms without departing from the spirit or essential characteristics thereof. The present embodiments are, therefore, to be considered in all respects as illustrative and not restrictive, and the scope of the invention being indicated by the appended claims rather than by the foregoing description, and all changes which come within the meaning and range of equivalency of the claims are, therefore, to be embraced therein.

What is claimed and desired to be secured by United States Letters Patent is:

1. A method of plasticizing and extruding a plastic composition to homogeneously disperse pigment therethroughout, comprising the steps of introducing the composition ingredients, including pigment, into a plasticizer-extruder, helically displacing said ingredients through said plasticizer-extruder to mix and plasticize said ingredients, discharging said plasticized composition from said plasticizer-extruder into a transversely disposed pressure chamber, isolating said pressure chamber from said plasticizer-extruder, displacing said composition axially through a portion of said pressure chamber at a pressure greater than that generated in said plasticizer-extruder in a direction substantially transverse to any residual flow lines present in said composition when issuing from said plasticizer-extruder, and sequentially and repeatedly shearing said composition first axially and then transversely of said pressure chamber through at least a portion of said pressure chamber to obliterate said pigment flow lines and to homogeneously disperse said pigment through the remainder of said composition, and finally issuing said composition from said pressure chamber as uniformly colored plasticized material.

2. A method of plasticizing and extruding a plastic composition to homogeneously disperse pigment therethroughout, comprising the steps of issuing plasticized material containing a dispersed pigment from a screw-type plasticizer-extruder and at a first output pressure into a separate pressure chamber, isolating the material in said chamber from said plasticizer-extruder, displacing said material under pressure axially through said pressure chamber at a second and different pressure and sequentially deflecting and shearing said material first axially and then transversely of said pressure chamber through a shear path during at least a portion of its residence time in said pressure chamber to insure the homogeneous dispersion of said pigment through the remainder of said material.

3. In a method of homogeneously dispersing pigment throughout a plastic composition during extrusion, the improvement comprising the steps of mixing the composition ingredients, including pigment, in a first helical pattern and thereafter mixing said composition in a second non-helical pattern subjecting the composition to sequential axial and transverse shear forces to obliterate any residual flow lines, said two patterns being (1) entirely independent, (2) performed in sequence at spaced locations and (3) carried out at different pressure levels, the pressure forcing said composition through said second pattern being the greater pressure, and issuing the composition as uniformly colored plasticized material.

References Cited

UNITED STATES PATENTS

| | | | |
|---|---|---|---|
| 3,148,412 | 9/1964 | Spreedwers | 264—211 |
| 3,259,944 | 7/1966 | McIlvin | 18—30 |
| 3,298,061 | 1/1967 | Pomper | 18—30 |

FOREIGN PATENTS 222,008  9/1942  Switzerland.

ALEXANDER H. BRODMERKEL, *Primary Examiner.*

T. MORRIS, *Assistant Examiner.*